United States Patent
Zhu et al.

(10) Patent No.: US 10,286,701 B2
(45) Date of Patent: May 14, 2019

(54) HAND STAMP WITH USE COUNT AND SMART PHONE AUTHORIZATION

(71) Applicants: Shengbo Zhu, San Jose, CA (US); Su Shiong Huang, Belleville, WA (US)

(72) Inventors: Shengbo Zhu, San Jose, CA (US); Su Shiong Huang, Belleville, WA (US)

(73) Assignee: SILICON VALLEY MICRO E CORP., San Jose, CA (US)

( * ) Notice: Subject to any disclaimer, the term of this patent is extended or adjusted under 35 U.S.C. 154(b) by 119 days.

(21) Appl. No.: 15/731,220

(22) Filed: May 4, 2017

(65) Prior Publication Data

US 2018/0319186 A1 Nov. 8, 2018

(51) Int. Cl.
*B41K 1/36* (2006.01)
*B41K 1/00* (2006.01)
*H04W 4/80* (2018.01)

(52) U.S. Cl.
CPC ............... *B41K 1/003* (2013.01); *B41K 1/36* (2013.01); *B41K 1/366* (2013.01); *H04W 4/80* (2018.02)

(58) Field of Classification Search
CPC .......... B41K 1/00; B41K 1/003; B41K 1/006; B41K 1/40; B41K 1/58; B41K 1/366; B41K 1/36; G06M 1/00; G06M 1/083; G06M 3/06; H04W 4/80
See application file for complete search history.

(56) References Cited

U.S. PATENT DOCUMENTS

| | | | | |
|---|---|---|---|---|
| 3,436,163 A | * | 4/1969 | Gang | A63F 3/06 273/148 R |
| 4,532,642 A | * | 7/1985 | Morris | B41K 1/366 101/104 |
| 4,993,050 A | * | 2/1991 | Carpenteri | G06M 1/083 235/64 |
| 5,271,322 A | * | 12/1993 | Palma | B41K 1/00 101/333 |
| 5,995,123 A | * | 11/1999 | McCormick | B43K 8/024 346/14 MR |
| 7,172,358 B1 | * | 2/2007 | Rudelius | B43K 7/12 346/139 R |

(Continued)

FOREIGN PATENT DOCUMENTS

| CN | 201214319 | * | 4/2009 | .............. B41K 1/02 |
| CN | 107351552 | * | 11/2017 | .............. B41K 1/58 |

(Continued)

*Primary Examiner* — Matthew G Marini
*Assistant Examiner* — Marissa Ferguson-Samreth (57) ABSTRACT

A hand stamp with a use count mechanism and security elements for preventing unauthorized use. The use count mechanism includes a magnet mounted on an inner shell for relative movement with a stamp image platen carried by an outer shell, a magnetic field sensor carried by the outer shell for sensing movement between the magnet and the outer shell when the platen is moved to a stamping position, and an MCU for converting sensor signals to signals for a display. The security elements include print sensors mounted on the outer shell for sensing the finger prints of a user, with the MCU configured to convert these signals for transmission via a Bluetooth module to a smart phone containing finger print signals of an authorized user. If the fingerprint signals match, the smart phone sends an authorization signal to the MCU, which responds by unlocking the hand stamp.

9 Claims, 6 Drawing Sheets

(56) References Cited

U.S. PATENT DOCUMENTS

| | | | | |
|---|---|---|---|---|
| 7,954,429 B1* | 6/2011 | Abukhdair | ............. | B41K 1/366 |
| | | | | 101/103 |
| 8,695,500 B2* | 4/2014 | Faber | ...................... | B41K 1/40 |
| | | | | 101/104 |
| 2003/0047095 A1* | 3/2003 | Cho | ......................... | B41K 1/04 |
| | | | | 101/327 |
| 2003/0106447 A1* | 6/2003 | Walling | .................... | B41J 3/28 |
| | | | | 101/327 |
| 2005/0201809 A1* | 9/2005 | Silverbrook | ............... | B41J 3/36 |
| | | | | 400/693 |
| 2015/0144015 A1* | 5/2015 | Faber | .................. | B41J 2/16508 |
| | | | | 101/333 |
| 2017/0341446 A1* | 11/2017 | Almutairi | .............. | B41K 1/003 |
| 2018/0009250 A1* | 1/2018 | Bishop | .................. | G06M 1/083 |

FOREIGN PATENT DOCUMENTS

| | | | | |
|---|---|---|---|---|
| DE | 29703669 | * | 4/1997 | ............... B41K 1/36 |
| JP | 2005193517 | * | 7/2005 | ............... B41K 1/36 |
| KR | 1797211 | * | 8/2016 | ............... B41K 1/02 |
| TW | 576807 | * | 2/2004 | ............... B41K 1/36 |
| WO | WO2014122681 | * | 2/2013 | ............... B41K 1/14 |

* cited by examiner

HAND STAMP WITH USE COUNT AND SMART PHONE AUTHORIZATION

BACKGROUND OF THE INVENTION

This invention relates to hand stamps used to mark documents and other objects with a distinctive image. More particularly, this invention relates to an improved hand stamp having a use counting capability and use limited to only users authorized via a smart phone.

Hand stamps have long been used to mark documents and other objects (such as cartons) with a distinctive image serving to certify the identity or content of the document or object. A typical hand stamp comprises a combination of a protective inner shell and an outer shell assembled for mutual translatory motion along a common longitudinal axis. A centrally located support shank is connected at one end to the outer shell for motion therewith and a stamp platen bearing the stamp image is positioned on the other end of the shank. An inking pad is pivotally connected to a mounting portion of the outer shell so that the inking pad contacts the stamp platen when the hand stamp is in a dormant position with the stamp platen retracted into the protective inner shell and the inking pad pivots away from the stamp platen when the outer shell in manipulated along the common longitudinal axis and the stamp platen is extended beyond the limit of the protective inner shell. A biasing mechanism ,maintains the stamp platen in the retracted position when no manipulative force is applied to the outer shell. Examples of known hand stamps of this type are disclosed in U.S. Pat. No. 5,727,467 issued Mar. 17, 1998 for "Hand Stamp", U.S. Pat. No. 6,892,638 issued May 17, 2005 for "Hand Stamp And Locking Storage Cap", and U.S. Patent Application Publication number US 2014/0230671 A1 published Aug. 21, 2014 for "Self-Inking Stamp", the disclosures of which are hereby incorporated by reference.

As noted above, many known hand stamps are used to certify the identity or content of a document or an object. For example, in China and Japan a hand stamp bearing a unique image issued to an individual is required to open a bank account or enable other bank transactions. Similarly, a hand stamp bearing a unique image issued to a corporation or other business entity is required to conduct legally binding business transactions. If a hand stamp is borrowed or stolen, there is nothing to prevent an unauthorized possessor of the hand stamp from conducting fraudulent transactions. Known hand stamps have no provision for protection against such unauthorized use.

In many business organizations it is customary for an individual having the authority to legally bind the business entity to a financial or other business commitment by virtue of personal possession of the company hand stamp to delegate this authority to another individual employee for limited purposes by temporarily transferring possession of the company hand stamp to that other individual with instructions to use it for only such limited purposes. For example, the authorized individual may instruct the other individual to use the company hand stamp to certify a limited number of company checks for payment. Unless the authorized individual closely monitors the other individual's use of the company hand stamp, there is no control on the use of the company hand stamp by that other individual, who is free to certify more company checks for payment than the authorized limited number. Known hand stamps have no provision for protection against such abuse of delegated authority.

SUMMARY OF THE INVENTION

The invention comprises a hand stamp devoid of the above-noted disadvantages in known hand stamps, and which incorporates a use counting capability and limits use to only users authorized via a smart phone.

From a combination aspect, the invention comprises a hand stamp provided with both a use counting capability and an authorized user only capability. According to this aspect, the invention comprises a hand stamp with an outer shell having a hollow interior; an inner shell located within the hollow interior of the outer shell and relatively movable therein, the inner shell having a hollow interior; the inner shell and the outer shell having a common longitudinal axis; a stamp image carried by the outer shell within the hollow interior of the inner shell; a biasing device, preferably a spring, for providing a biasing force between the inner shell and the outer shell in a first direction along the common longitudinal axis; a limit stop mechanism for limiting relative movement between the inner shell and the outer shell along the common longitudinal axis; a releasable locking mechanism for normally preventing relative movement between the inner shell and the outer shell in the first direction until released; at least one user print sensor, preferably a pair of print sensors, carried by the outer shell for generating user identification signals when contacted by the finger print of a user; a microcontroller unit carried by the hand stamp and coupled to the at least one print sensor and configured for receiving and converting the identification signals to transmittable equivalent signals; a communication unit coupled to the microcontroller unit for transmitting the equivalent signals to an associated device containing print signals of an authorized user and for transmitting to the communication unit a release signal when the equivalent signals match the print signals of an authorized user; the microcontroller unit being configured to generate a locking mechanism release signal for unlocking the hand stamp for use in response to the receipt of the release signal by the communication unit; and a use count mechanism for counting the number of uses of the hand stamp when unlocked.

The releasable locking mechanism preferably comprises an electrically operable solenoid; and the microcontroller unit is configured to generate a solenoid actuation signal is response to the receipt of the release signal by the communication unit. The solenoid has a main body member mounted to the outer shell and a shaft retractably mounted to the main body member and in engagement with the inner shell when in an unreleased state.

The limit stop mechanism preferably comprises at least one post connected to the inner shell and extending outwardly thereof, and at least one slot formed in the outer shell; with the at least one post extending into the at least one slot.

The communication unit preferably comprises a Bluetooth communication unit.

The use count mechanism preferably comprises a magnet carried by one of the inner shell and the outer shell for generating a magnetic field, a magnetic field sensor carried by the other one of the inner shell and the outer shell for sensing changes of the value of the magnetic field generated by the magnet by movement of the stamp image to a print position; the magnetic field sensor being coupled to the microcontroller unit; and the microcontroller being configured with a counter for counting the number of movements of the stamp image to the print position sensed by the magnetic field sensor. The use count mechanism preferably further includes a display device coupled to the microcontroller unit for displaying the contents of the counter.

From an authorized user only capability standpoint the invention comprises a hand stamp with security provisions for preventing unauthorized use, the hand stamp including an outer shell having a hollow interior; an inner shell located within the hollow interior of the outer shell and relatively movable therein, the inner shell having a hollow interior; the inner shell and the outer shell having a common longitudinal axis; a stamp image carried by the outer shell within the hollow interior of the inner shell; a biasing device, preferably a spring, for providing a biasing force between the inner shell and the outer shell in a first direction along the common longitudinal axis; a limit stop mechanism for limiting relative movement between the inner shell and the outer shell along the common longitudinal axis; a releasable locking mechanism for normally preventing relative movement between the inner shell and the outer shell in the first direction until released; at least one user print sensor, preferably a pair of print sensors, carried by the outer shell for generating user identification signals when contacted by the finger print of a user; a microcontroller unit carried by the hand stamp and coupled to the at least one print sensor and configured for receiving and converting the identification signals to transmittable equivalent signals; and a communication unit, preferably a Bluetooth device, coupled to the microcontroller unit for transmitting the equivalent signals to an associated device containing print signals of an authorized user and for transmitting to the communication unit a release signal when the equivalent signals match the print signals of an authorized user; the microcontroller unit being configured to generate a locking mechanism release signal for unlocking the hand stamp for use in response to the receipt of the release signal by the communication unit so that only a user with finger prints which match the print signals of an authorized user can operate the hand stamp.

The releasable locking mechanism preferably comprises an electrically operable solenoid; and the microcontroller unit is configured to generate a solenoid actuation signal is response to the receipt of the release signal by the communication unit. The solenoid has a main body member mounted to the outer shell and a shaft retractably mounted to the main body member and in engagement with the inner shell when in an unreleased state.

The limit stop mechanism preferably comprises at least one post connected to the inner shell and extending outwardly thereof, and at least one slot formed in the outer shell; the at least one post extending into the at least one slot.

From a use count capability aspect, the invention comprises a hand stamp having a use count mechanism for counting the number of uses of the hand stamp, the hand stamp including an outer shell having a hollow interior; an inner shell located within the hollow interior of the outer shell and relatively movable therein, the inner shell having a hollow interior; the inner shell and the outer shell having a common longitudinal axis; a stamp image carried by the outer shell within the hollow interior of the inner shell; a biasing device, preferably a spring, for providing a biasing force between the inner shell and the outer shell in a first direction along the common longitudinal axis; a limit stop mechanism for limiting relative movement between the inner shell and the outer shell along the common longitudinal axis; a magnet carried by one of the inner shell and the outer shell for generating a magnetic field; a magnetic field sensor carried by the other one of the inner shell and the outer shell for sensing changes of the value of the magnetic field generated by the magnet by movement of the stamp image to a print position; and a microcontroller unit carried by the hand stamp and coupled to the magnetic field sensor, the microcontroller being configured with a counter for counting the number of movements of the stamp image to the print position sensed by the magnetic field sensor.

The use count mechanism further preferably includes a display device coupled to the microcontroller unit for displaying the contents of the counter.

Hand stamps fabricated according to the invention provide two important capabilities not present in currently know hand stamps. Firstly, the security afforded by the MCU and communication units prevents use of the hand stamp by anyone but an authorized user. Secondly, the use count capability afforded by the magnet, magnetic field sensor and the microcontroller unit provides a use tracking capability useful to the user as well as supervisory personnel. Also, the provision of the counter display enables an authorized user to monitor the number of times they have actually used the hand stamp.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
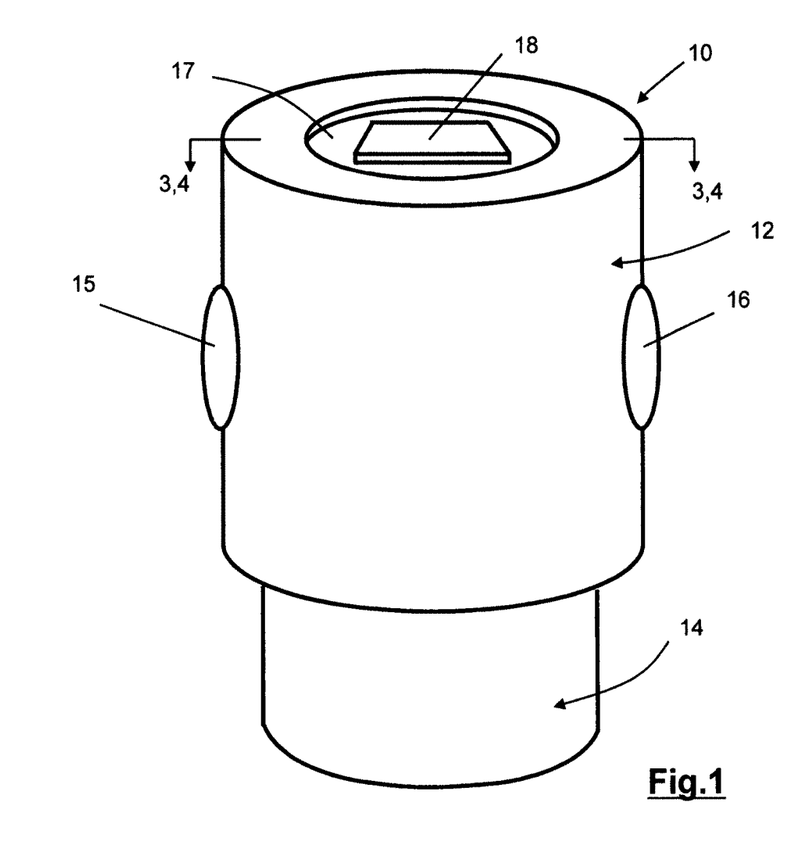
FIG. 1 is a perspective view of a preferred embodiment of a hand stamp incorporating the invention.

Turning now to the drawings, FIG. 1 is a perspective view of a hand stamp according to the invention. As seen in this Fig., a hand stamp generally designated with reference numeral 10 has an outer shell 12 and an inner shell 14. Located on outer shell 12 at opposite diametric locations is a pair of print sensors 15, 16. Print sensors 15, 16 are commercially available known devices capable of generating signals representative of the fingerprint and thumbprint of an individual grasping the outer shell 12 with the portions of the individual's finger and thumb bearing the unique prints of that individual in surface contact with sensors 15, 16. In the preferred embodiment, print sensors are each type MIKROE-1722 sensors available from MicroElectronika of Belgrade, Serbia. Other commercially available print sensors may be employed, depending on the preferences of those of ordinary skill in the art.

Mounted in a recessed top surface portion 17 of outer shell 12 is a display device 18 for a purpose described below. Display device may comprise any one of a number of known display devices commonly found in commercial electronic products, such as liquid crystal displays, LED displays, and organic LED displays.

Figure 2:
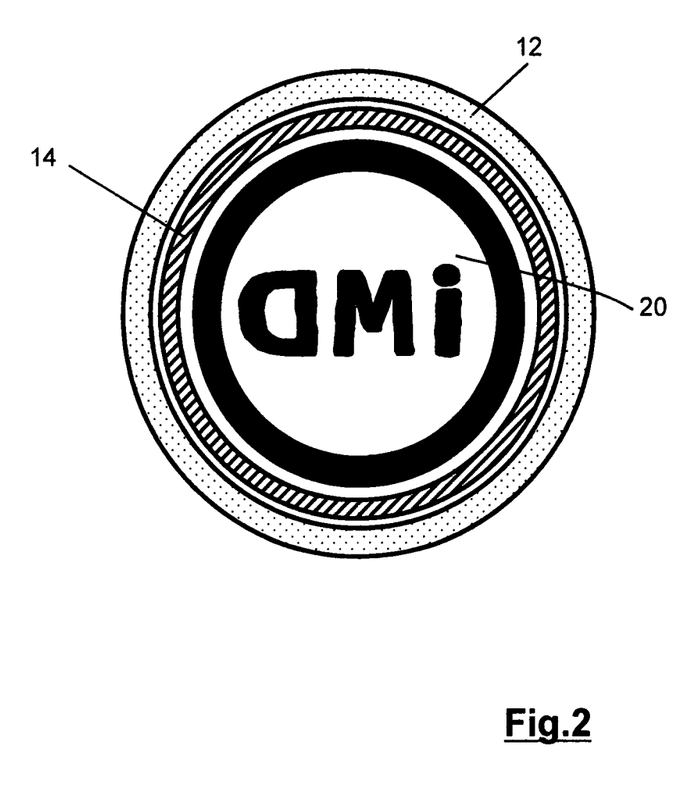
FIG. 2 is a bottom plan view of the embodiment of FIG. 1 illustrating the stamp.

FIG. 2 is a bottom plan view of the embodiment of FIG. 1 illustrating the stamp image surface 20 which is centrally located with respect to outer shell 12 and inner shell 14. As seen in this Fig., the image formed on surface 20 is the reverse of the positive image " iMD" so that the positive image "iMD" will be printed whenever the image is applied to a surface.

Figure 3:
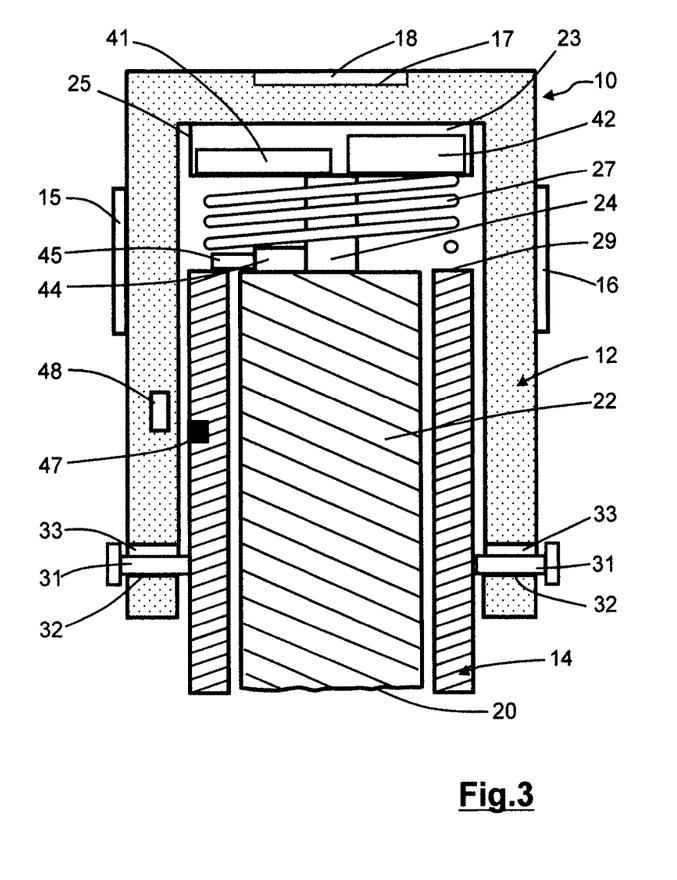
FIG. 3 is a sectional view taken along lines 3-3 of FIG. 1 illustrating the major mechanical components with the hand stamp in the locked and dormant state.
Figure 4:
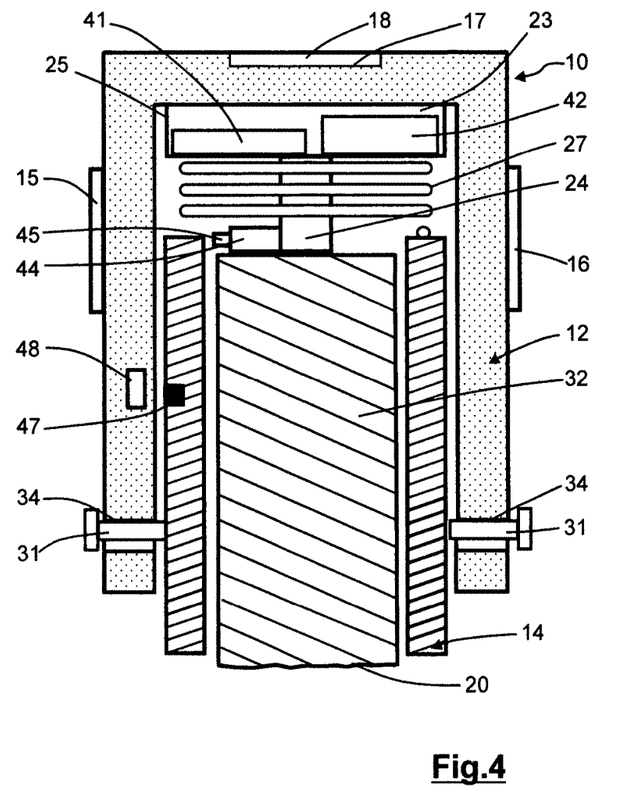
FIG. 4 is a sectional view similar to FIG. 3 illustrating the major mechanical components in the unlocked and actuated state.
Figure 5:
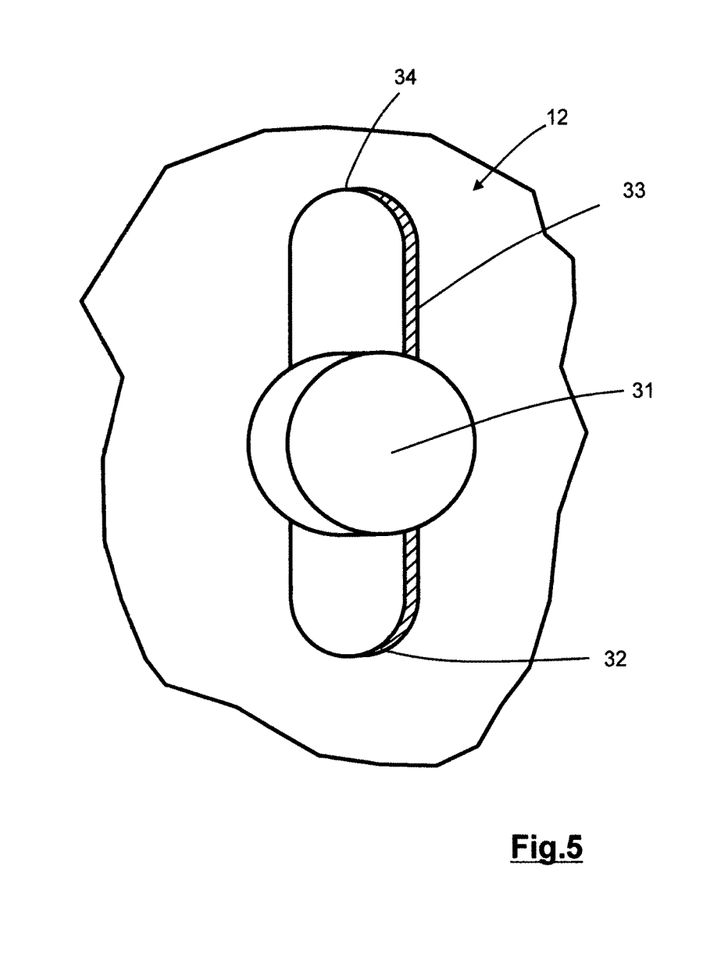
FIG. 5 is an enlarged perspective view of a portion of outer shell 12 illustrating an inner shell post and an outer shell slot.

FIGS. 3 and 4 are a sectional views taken along lines 3-3 and 4-4 of FIG. 1 illustrating the major mechanical and electronic components of the hand stamp 10 of FIG. 1. As seen in both Figs., outer shell 12 has a hollow interior which encloses several components, including inner shell 14 which is slidably received for translatory motion with respect to outer shell 12 along the common longitudinal axis of hand stamp 10. A central shank 22 bearing the stamp image surface 20 at the bottom thereof is secured to the upper inner surface 23 of outer shell 12 by means of a connecting shaft 24 and a platform 25. A bias spring 27 positioned between the lower surface of platform 25 and the upper edge 29 of inner shell 14 urges inner shell 14 in the outward direction of outer shell 12. The resulting translatory relative motion between inner shell 14 and outer shell 12 is limited by the interaction between a pair of outwardly extending posts 31 secured to inner shell 14 and the lower edge 32 of a pair of slots 33 formed in outer shell 12, with posts 31 extending through slots 33, as illustrated in FIG. 5.

Mounted on platform 25 is a module 41 containing a Bluetooth communications unit and a microcontroller unit (BCU), and a battery 42 used to provide electrical power to module 41. Module 41 is preferably a commercially available single device incorporating both the Bluetooth unit and the MCU providing Bluetooth communication between the MCU and a separate smart phone in the manner described below. Preferably, module 41 is a type BLE113-A-V1 device available from Silicon Labs of Austin, Tex.

Secured to the upper surface of shank 22 is a small electrically operable solenoid 44 with a retractable shaft 45 which extends outwardly over the upper surface 29 of inner shell 14 when solenoid 44 is in the unactivated state. This prevents downward motion of outer shell 12 with respect to inner shell 14 until solenoid 44 is activated by a control signal from the MCU section of module 41. Solenoid 44 is preferably a type BS-0319 micro solenoid available from Dongguan Boshun Industry, Inc. of Dongguan Shi, Guangdong Sheng, China.

Mounted to or within inner shell 14 is a permanent magnet 47, which co-acts in the manner described below with a magnetic field sensor 48. Magnetic field sensor 48 is any known magnetic field sensor, such as a Hall Effect sensor, capable of detecting the passage of magnet 47 thereby. Sensor 48 is electrically connected to a dedicated input of the MCU section of module 41.

FIG. 3 illustrates the hand stamp of FIG. 1 in the locked and dormant state, In this state, bias spring 27 urges inner shell 14 downwardly with respect to outer shell 12 until posts 31 are lodged against lower edges of slots 33 thereby preventing any further motion in this direction. In addition, solenoid shaft 45 engages the upper surface 29 of inner shell 14 thereby preventing any upward motion between inner shell 14 and outer shell 12.

FIG. 4 illustrates the hand stamp of FIG. 1 in the unlocked and actuated state. In this state, solenoid 44 is actuated so that solenoid shaft 45 is retracted to free up relative upward motion of inner shell 14 with respect to outer shell 12. When a downward force is applied to outer shell 12, the resulting relative motion between inner shell 14 and outer shell 12 causes magnetic field sensor 48 to encounter the magnetic field generated by magnet 47 and generate a signal, which is supplied to the MCU section of module 41. This signal is used by the MCU section of module 41 to increment a counter configured in the MCU section, and the output of this counter is used to drive display 18 so that display 18 displays the number of stamping events in real time. As relative motion continues, shank 22 moves in the downward direction until posts 31 engage the upper edge 34 of slots 33. In this position, stamp image surface 20 extends below the lower edge of inner shell 14 to enable contact between stamp image surface 20 and the document or object surface on which the image is to be printed. When the downward force is removed, bias spring 27 causes relative motion between inner shell 14 and outer shell 12 until posts 31 engage the lower surface 32 of slots 33. Solenoid 44 is then deactuated by the MCU section of module 41 locking together inner shell 14 and outer shell 12 in the manner described above.

Figure 6:
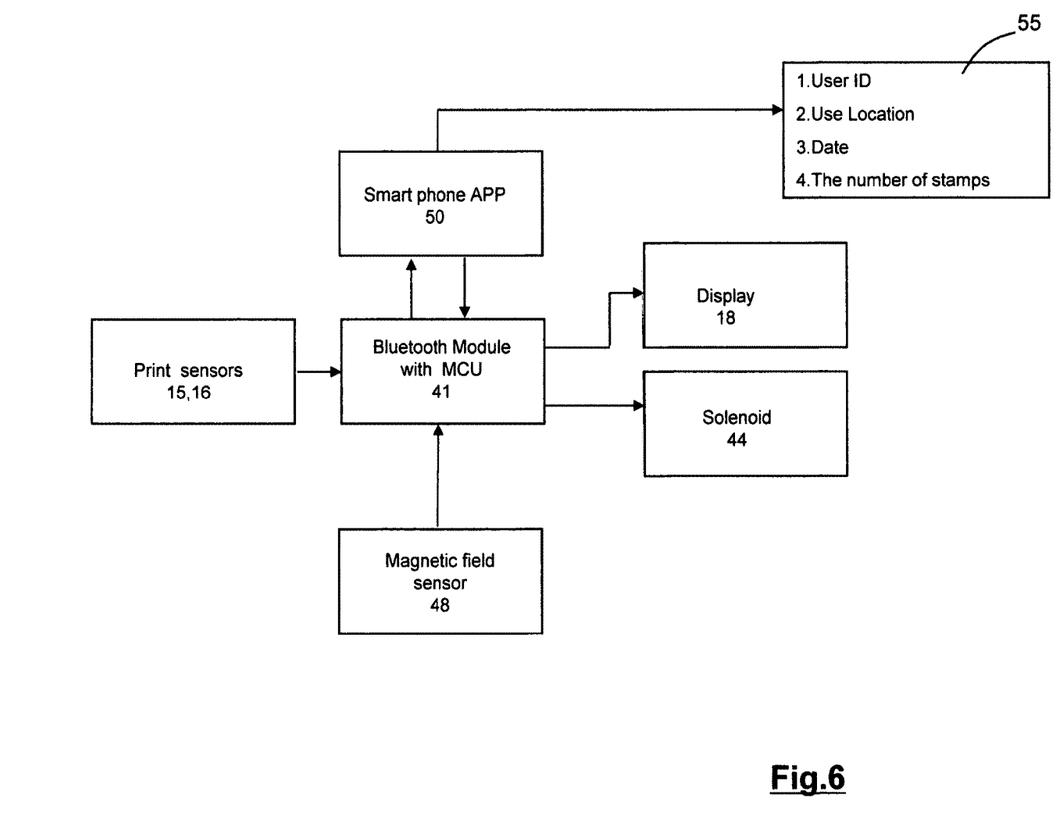
FIG. 6 is a block diagram illustrating the electronic system of the FIG. 1 embodiment.

FIG. 6 is a block diagram illustrating the electronic system of the FIG. 1 embodiment. As seen in this Fig., both print sensors 15, 16 and magnetic field sensor 48 are coupled to dedicated inputs of the MCU section of module 41. Different outputs of the MCU section of module 41 are individually coupled to display 18 and solenoid 44. The information supplied to the display 18 is the current number of hand stamp 10 use counts contained in the counter configured within the MCU section of module 41. The information supplied to solenoid 44 is the solenoid actuation signal, which can only be generated when an authorized user is operating the hand stamp 10 as described below.

The Bluetooth section of module 41 is coupled in a bidirectional communications mode to a hand stamp 10 user smart phone 50 configured with a special dedicated APP for enabling communication of data between module 41 and smart phone 50 and between smart phone 50 and the smart phone of one or more authorized supervisory personnel. The supervisory person smart phone is configured to transmit to the desired user smart phone 50 the print information of the user whom the supervisor wishes to authorize to use the hand stamp 10. This print information is stored in the user smart phone 50.

When the user wishes to operate the hand stamp 10, the user places their thumb and a finger on the print sensors 15, 16. The information generated by the print sensors 15, 16 is coupled to the MCU section of module 41 and this information is relayed to the user smart phone 50 by the Bluetooth section of module 41. The user smart phone 50 compares the information received from the module 41 with the print information stored therewithin. If there is a match, the user smart phone sends an enabling signal to module 41, which causes the MCU section of module 41 to activate solenoid 44, thereby enabling operation of the hand stamp 10. If there is no match the enabling signal is not sent and the hand stamp remains locked.

After the hand stamp is enabled, the MCU section of the module counts the number of times the hand stamp 10 is operated and display 18 displays this information. The current count value may also be transmitted by the Bluetooth section of module 41 to the user smart phone 50 in real time or at periodic intervals. The count information contained in the user smart phone 50 may be automatically transmitted to the supervisory person's smart phone in real time or on a periodic basis, or this information may be transmitted to the supervisory person's smart phone upon request. In this way, the supervisory person can monitor the hand stamp 10 use in real time or on a periodic basis. If the number of hand stamp 10 uses reaches a limit, the operation of the hand stamp 10 can be terminated by sending a termination signal to the user's smart phone 50. Alternatively, the permitted number of uses can be initially transmitted from the supervisor's smart phone to the user's smart phone 50 and, if the actual number of uses reaches this limit, the user's smart phone can send a termination signal to module 41, which causes the MCU section of module 41 to deactuate solenoid 44.

The user smart phone APP also can accumulate additional information which can be relayed to the supervisor's smart phone. Examples of such additional information are the user ID, the date, and the user location (using the GPS capability of the user's smart phone). Block 55 in FIG. 6 schematically portrays this function.

As will now be apparent, hand stamps fabricated according to the teachings of the invention incorporate two significant advantages hitherto unavailable in known hand stamps. Firstly, the security afforded by the MCU and Bluetooth units in module 41 prevents use of the hand stamp 10 by all but an authorized user. Secondly, the use count capability afforded by magnet 47, magnetic field sensor 48 and the MCU in module 41 provides a use tracking capability useful to supervisory personnel. Also, the provision of display 18 enables an authorized user to monitor the number of times they have actually used the hand stamp 10.

Although the above provides a full and complete disclosure of the preferred embodiment of the invention, various modifications, alternate constructions and equivalents will occur to those skilled in the art. For example, while the print sensors 15, 16 have been illustrated and described as being positioned at diametrically opposed locations on outer shell 12, these elements may be located elsewhere on the surface of outer shell 12 in locations convenient to a user. Further, while the preferred embodiment of the invention has been illustrated and described as having oppositely located posts 31 and slots 33, the configuration and number of posts 31 and slots 33 may be different, depending on the preferences of the designer. Also, while solenoid 44 has been illustrated and described as being mounted on the upper surface of shank 22 with the solenoid shaft 45 engageable with the upper surface 29 of inner shell 14, if desired solenoid 44 may be mounted within the inner wall of outer shell 12 with solenoid shaft 45 engageable with a cross bore formed in the outer wall of inner shell 14. :Lastly, while the preferred embodiment of the invention has been illustrated and described as a hand stamp lacking the conventional inking mechanism shown and described in the above-referenced prior art references, it is understood that such self-inking mechanisms may be incorporated into hand stamps fabricated according to the teachings of the invention. Therefore, the above should not be construed as limiting the invention, which is defined by the appended claims.

What is claimed is:

1. A hand stamp with security provisions for preventing unauthorized use, said hand stamp comprising:
   an outer shell having a hollow interior;
   an inner shell located within said hollow interior of said outer shell and relatively movable therein, said inner shell having a hollow interior;
   said inner shell and said outer shell having a common longitudinal axis;
   a stamp image carried by said outer shell within said hollow interior of said inner shell;
   a biasing device for providing a biasing force between said inner shell and said outer shell in a first direction along said common longitudinal axis;
   a limit stop mechanism for limiting relative movement between said inner shell and said outer shell along said common longitudinal axis;
   a releasable locking mechanism for normally preventing relative movement between said inner shell and said outer shell in said first direction until released;
   at least one user print sensor carried by said outer shell for generating user identification signals when contacted by a fingerprint of a user;
   a microcontroller unit carried by said hand stamp and coupled to said at least one print sensor and configured for receiving and converting said identification signals to transmittable equivalent signals; and
   a communication unit coupled to said microcontroller unit for wirelessly transmitting said equivalent signals to an associated device containing fingerprint identification signals of an authorized user and for receiving a release signal wirelessly transmitted to said communication unit by said associated device when said equivalent signals match said fingerprint identification signals of an authorized user;
   said microcontroller unit being configured to generate a locking mechanism release signal for unlocking said hand stamp for use in response to the receipt of said release signal by said communication unit so that only a user with fingerprints which match the fingerprint identification signals of an authorized user can operate the hand stamp.

2. The invention of claim 1 wherein said biasing device comprises a spring mounted between said inner shell and said outer shell.

3. The invention of claim 1 wherein said releasable locking mechanism comprises an electrically operable solenoid; and wherein said microcontroller unit is configured to generate a solenoid actuation signal in response to the receipt of said release signal by said communication unit.

4. The invention of claim 3 wherein said solenoid has a main body member mounted to said outer shell and a shaft retractably mounted to said main body member and in engagement with said inner shell when in an unreleased state.

5. The invention of claim 1 wherein said at least one print sensor comprises a pair of print sensors mounted at different locations on said outer shell; and wherein each of said pair of print sensors is coupled to said microcontroller unit.

6. The invention of claim 1 wherein said limit stop mechanism comprises at least one post connected to said inner shell and extending outwardly thereof, and at least one slot formed in said outer shell; said at least one post extending into said at least one slot.

7. The invention of claim 1 wherein communication unit comprises a Bluetooth communication unit.

8. The invention of claim 1 wherein said microcontroller is configured to provide a use count mechanism for counting the number of uses of said hand stamp when unlocked; and wherein said hand stamp further includes stop means for terminating said locking mechanism release signal to disable use of said hand stamp when a specified number of uses has been reached.

9. The invention of claim 8 wherein said stop means includes said communication unit for wirelessly transmitting signals representative of the current count value in said count mechanism to said associated device;
   wherein said associated device includes means for comparing the received current count value signals with said specified number and for generating a use termination signal when said current count value equals said specified number of uses and wirelessly transmitting said use termination signal to said communication unit;

said microcontroller unit being configured to terminate said locking mechanism release signal to lock said hand stamp for further use in response to the receipt of said use termination signal by said communication unit so that only said specified number of uses is permitted.

* * * * *